(12) United States Patent
Roberts et al.

(10) Patent No.: US 9,043,744 B2
(45) Date of Patent: May 26, 2015

(54) CONVERTING EXISTING ARTIFACTS TO NEW ARTIFACTS

(75) Inventors: Melissa Roberts, Boulder, CO (US); Sherry Cowart, Golden, CO (US); Melissa Campbell, Cumming, GA (US)

(73) Assignee: MCKESSON FINANCIAL HOLDINGS

( * ) Notice: Subject to any disclaimer, the term of this patent is extended or adjusted under 35 U.S.C. 154(b) by 546 days.

(21) Appl. No.: 13/226,986

(22) Filed: Sep. 7, 2011

(65) Prior Publication Data
US 2013/0061200 A1    Mar. 7, 2013

(51) Int. Cl.
G06F 9/44    (2006.01)
G06F 17/22   (2006.01)
G06F 17/27   (2006.01)

(52) U.S. Cl.
CPC .............. *G06F 17/2276* (2013.01); *G06F 8/10* (2013.01); *G06F 17/273* (2013.01)

(58) Field of Classification Search
None
See application file for complete search history.

(56) References Cited

U.S. PATENT DOCUMENTS

| 2006/0064178 | A1* | 3/2006 | Butterfield et al. | 700/18 |
| 2007/0266368 | A1* | 11/2007 | Szpak et al. | 717/105 |
| 2012/0246609 | A1* | 9/2012 | Boden et al. | 717/101 |

OTHER PUBLICATIONS

Cohn, Mike, "Advantages of the 'As a user, I want' user story template", Apr. 25, 2008, http://www.mountaingoatsoftware.com/blog/advantages-of-the-as-a-user-i-want-user-story-template, Retrieved Dec. 3, 2013.*
"How can we map use cases to stories?", Jun. 18, 2008, Agilefaq, https://agilefaq.wordpress.com/2008/06/18/how-can-we-map-use-cases-to-stories/, Retrieved Dec. 24, 2014.*
Robert Raszczynski, "How to Create User Stories", Jul. 19, 2011, TechPortal, http://techportal.inviqa.com/2011/07/19/how-to-create-user-stories/, Retrieved Dec. 24, 2014.*

* cited by examiner

*Primary Examiner* — Chameli Das
*Assistant Examiner* — Joanne Macasiano
(74) *Attorney, Agent, or Firm* — Alston & Bird LLP

(57) ABSTRACT

Systems, Apparatus, methods, and computer program products are provided for converting an existing artifact to one or more new artifacts. For example, in one embodiment, a computing device can receive input identifying an existing artifact for conversion to one or more new artifacts. One or more items from the existing artifact and their respective types can be identified for conversion. Then, the one or more items of the existing artifact can be converted to one or more new artifacts.

15 Claims, 15 Drawing Sheets

Fig. 5

| Use Case 1 Details | |
|---|---|
| Parent: n/a | |
| Primary Actors: Customer Administrator | Supporting Actors: System |
| Pre-Conditions: Customer Administrator logged into tool. Approval to delete ancillary result has been given to user. | Success Guarantee: Ancillary result is removed from the patient record. |
| Level: User | Complexity: Low |
| Flow of Events | |

Main Success Scenario:
1. User enters facility, patient identifier information and selects search
2. System returns results matching search criteria
3. User selects the patient and specific encounter
4. System presents action options to user (delete ancillary result, merge patient records, move data)
5. User selects to delete ancillary result
6. System presents anciallary results for specified patient and encounter
7. User selects the ancillary result to delete and verifies this is the correct result
8. User selects the reason for deletion and selects delete
9. System deletes the result from the patient record, updates all audit / logging tables, and presents a success message to the user
10. User acknowledges success
11. End

Extensions:
1. Search based on User and Date/Time
   1. System returns results matching search criteria
   2. User selects data for action
   3. Return to step 4
2. Error with search
   1. System returns error and updates all audit / logging tables with error information
   2. User cancels action
   3. End Specify the Actor to use in User Story | Customer Administrator |

[X] Replace the following text with the Actor identified above | User |

| | | Items from Use Case |
|---|---|---|
| User Story | > | User enters facility, patient identifier information and selects search |
| Accept Criteria | > | System returns results matching search criteria |
| User Story | > | User selects the patient and specific encounter |
| Accept Criteria | > | System presents action options to user (delete ancillary result, merge patient records, move data) |
| User Story | > | User selects to delete ancillary result |
| Accept Criteria | > | System presents ancillary results for specified patient and encounter |
| User Story | > | User selects the ancillary result to delete and verifies this is the correct result |
| | > | User selects the reason for deletion and selects delete |
| Accept Criteria | > | System deletes the result from the patient record, updates all audit / logging tables, and presents a success message to the user |
| | > | User acknowledges success |
| | > | End |
| User Story | > | Search based on User and Date/Time |
| Accept Criteria | > | System returns results matching search criteria |
| | > | User selects data for action |
| | > | Return to step 4 |
| Requirement | > | Error with search |
| Requirement | > | System returns error and updates all audit / logging tables with error information |
| | > | User cancels action |
| | > | End |

OK    Cancel

User Story 1

As a Customer Administrator I need to enters facility, patient identifier information and selects search.

Acceptance Criteria

System returns results matching search criteria

Fig. 9A

User Story 1

As a Customer Administrator, I need to enter a facility and a patient identifier information and select search.

Acceptance Criteria

System returns results matching search criteria

Fig. 9B

| User Story 2 |
|---|
| As a Customer Administrator, I need to selects the patient and specific encounter |

| Acceptance Criteria |
|---|
| System presents action options to user (delete ancillary result, merge patient records, move data) |

Fig. 10A

| User Story 2 |
|---|
| As a Customer Administrator, I need to select the patient and specific encounter |

| Acceptance Criteria |
|---|
| System presents action options to user (delete ancillary result, merge patient records, move data) |

| User Story 3 |
|---|
| As a Customer Administrator I need to selects to delete ancillary result |

| Acceptance Criteria |
|---|
| System presents ancillary results for specified patient and encounter |

Fig. 11B

| User Story 3 |
|---|
| As a Customer Administrator, I need to select to delete ancillary result |

| Acceptance Criteria |
|---|
| System presents ancillary results for specified patient and encounter |

| User Story 4 |
|---|
| As a Customer Administrator I need to selects the ancillary result to delete and verifies this is the correct result |
| Acceptance Criteria |
| System deletes the result from the patient record, updates all audit / logging tables, and presents a success message to the user |

Fig. 12A

| User Story 4 |
|---|
| As a Customer Administrator, I need to select the ancillary result to delete and verify this is the correct result |
| Acceptance Criteria |
| System deletes the result from the patient record, updates all audit / logging tables, and presents a success message to the user |

Fig. 12B

User Story 5

As a Customer Administrator I need to Search based on User and Date/Time

Acceptance Criteria

System returns results matching search criteria

Fig. 13A

User Story 5

As a Customer Administrator, I need to Search based on User and Date/Time

Acceptance Criteria

System returns results matching search criteria

Fig. 13B

Requirements

*Error with Search

*System returns error and updates all audit / logging tables with error information

Fig. 15

CONVERTING EXISTING ARTIFACTS TO NEW ARTIFACTS

BACKGROUND

Software developers, analysts, and organizations should not lose time or information when a software development methodology changes. Currently, there are no clear processes for converting requirements in, for example, an existing artifact (e.g., a use case) to a new artifact (e.g., a user story). Thus, to leverage any existing requirements documentation when a software development methodology changes, a need exists for converting existing artifacts (e.g., use cases) to new artifacts (e.g., user stories).

BRIEF SUMMARY

In general, embodiments of the present invention provide systems, methods, apparatus, and computer program products for converting existing artifacts to new artifacts.

In accordance with one aspect, a method for converting an existing artifact to one or more new artifacts is provided. In one embodiment, the method comprises (1) receiving input identifying an existing artifact for conversion to one or more new artifacts; (2) identifying a plurality of items from the existing artifact and causing display of the plurality of items; (3) receiving input identifying (a) one or more of the plurality of items from the existing artifact for conversion to the one or more new artifacts and (b) a type for each of the one or more of the plurality of items; and (4) converting the one or more of the plurality of items from the existing artifact to the one or more new artifacts.

In accordance with another aspect, a computer program product for converting an existing artifact to one or more new artifacts is provided. The computer program product may comprise at least one computer-readable storage medium having computer-readable program code portions stored therein, the computer-readable program code portions comprising executable portions configured to (1) receive input identifying an existing artifact for conversion to one or more new artifacts; (2) identify a plurality of items from the existing artifact and cause display of the plurality of items; (3) receive input identifying (a) one or more of the plurality of items from the existing artifact for conversion to the one or more new artifacts and (b) a type for each of the one or more of the plurality of items; and (4) convert the one or more of the plurality of items from the existing artifact to the one or more new artifacts.

In accordance with yet another aspect, an apparatus comprising at least one processor and at least one memory including computer program code is provided. In one embodiment, the at least one memory and the computer program code may be configured to, with the processor, cause the apparatus to (1) receive input identifying an existing artifact for conversion to one or more new artifacts; (2) identify a plurality of items from the existing artifact and cause display of the plurality of items; (3) receive input identifying (a) one or more of the plurality of items from the existing artifact for conversion to the one or more new artifacts and (b) a type for each of the one or more of the plurality of items; and (4) convert the one or more of the plurality of items from the existing artifact to the one or more new artifacts.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4-15 show exemplary input and output (including user interactions) that can be produced in accordance with various embodiments of the present invention.

DETAILED DESCRIPTION

Figure 1:
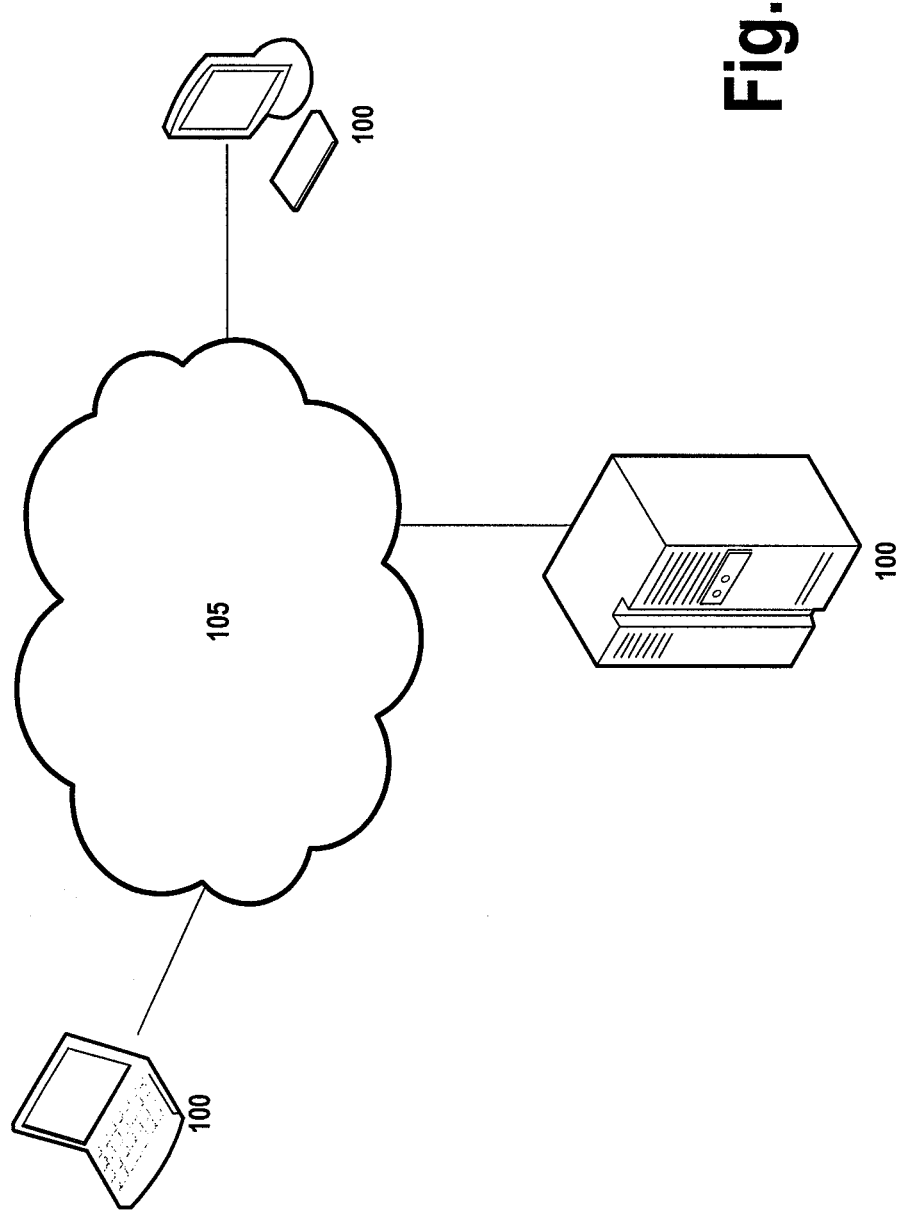
FIG. 1 is an overview of a system according to various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that can be used in conjunction with various embodiments of the present invention. As shown in FIG. 1, the system may include one or more computing devices 100 and a network 105. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture.

Figure 2:
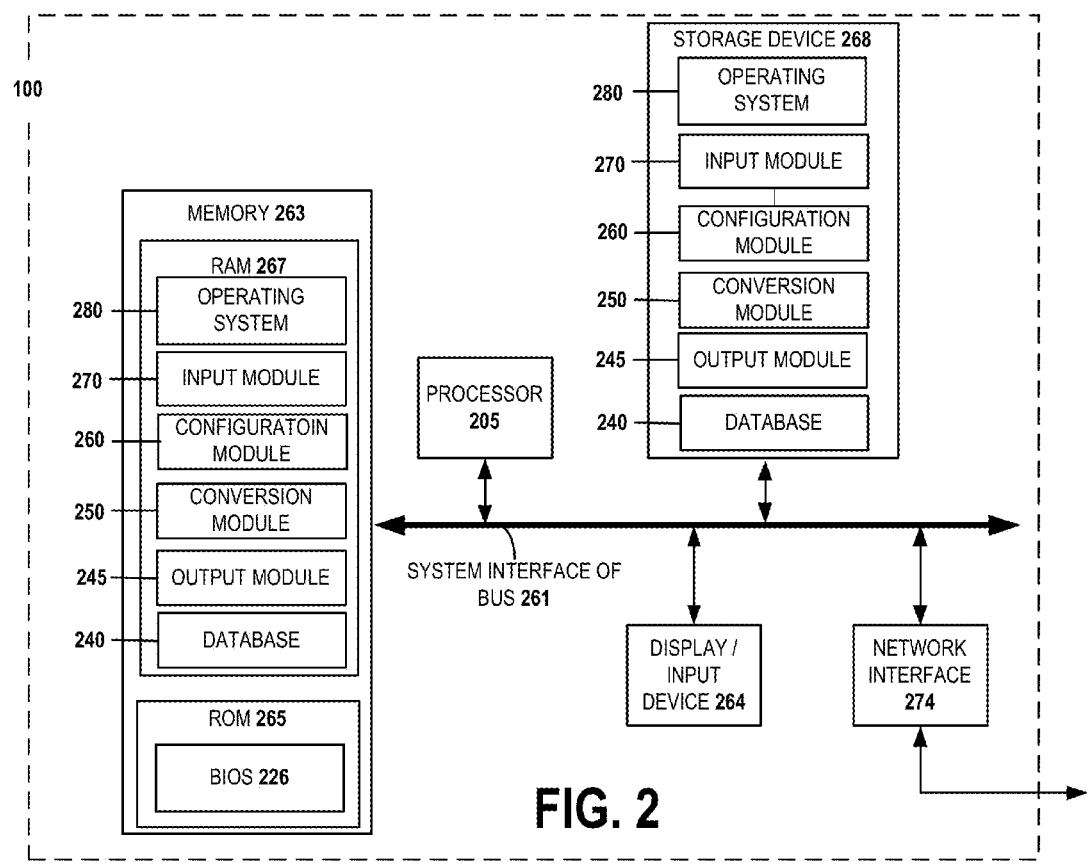
FIG. 2 is an exemplary schematic diagram of a computing device according to one embodiment of the present invention.

FIG. 2 provides a schematic of a computing device 100 according to one embodiment of the present invention. In general, the term "computing device" may refer to, for example, any computer, computing device, mobile phone, desktop, tablet, notebook or laptop, distributed system, server, blade, gateway, switch, processing device, or combination of processing devices adapted to perform the functions described herein. As will be understood from this figure, in one embodiment, the computing device 100 may include a processor 205 that communicates with other elements within the computing device 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. For example, as discussed in more detail below, the processor may be configured, among other things, to receive input identifying an existing artifact (e.g., a use case) to be converted. The processor may also be configured to convert the existing artifact (e.g., the use case) to a new artifact (e.g., a user story) and output the new artifact (e.g., the user story). A display/input device 264 for receiving and displaying data (e.g., image data) may also be included in (or in communication with) the computing device 100. This display device/input device 264 may be, for example, a keyboard or pointing device that is used in combination with a monitor (e.g., an electronic screen/display). The display/input device 264 may be a touchscreen that can detect the presence and location of a touch within the display area. The computing device 100 may further include transitory and non-transitory memory 263, which may include both random access memory (RAM) 267 and read only memory (ROM) 265. The computing device's ROM 265 may be used to store a basic input/output system (BIOS) 226 containing the basic routines that help to transfer information to the different elements within the computing device 100.

In addition, in one embodiment, the computing device 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 268 may be connected to the system bus 261 by an appropriate interface.

Furthermore, a number of executable instructions, applications, scripts, program modules, and/or the like may be stored by the various storage devices 268 and/or within RAM 267. Such executable instructions, applications, program modules, and/or the like may include an operating system 280, an input module 270, a configuration module 260, a conversion module 250, and an output module 240. As discussed in more detail below, these executable instructions, applications, program modules, and/or the like may control certain aspects of the operation of the computing device 100 with the assistance of the processor 205 and operating system 280—although their functionality need not be modularized. In addition to the program modules, the computing device 100 may store or be in communication with one or more databases, such as database 230.

Also located within the computing device 100, in one embodiment, is a network interface 274 for interfacing with various computing entities. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the computing device's 100 components may be located remotely from other computing device 100 components. Furthermore, one or more of the components may be combined and additional components performing functions described herein may be included in the computing device 100.

III. Exemplary System Operation

Figure 3:
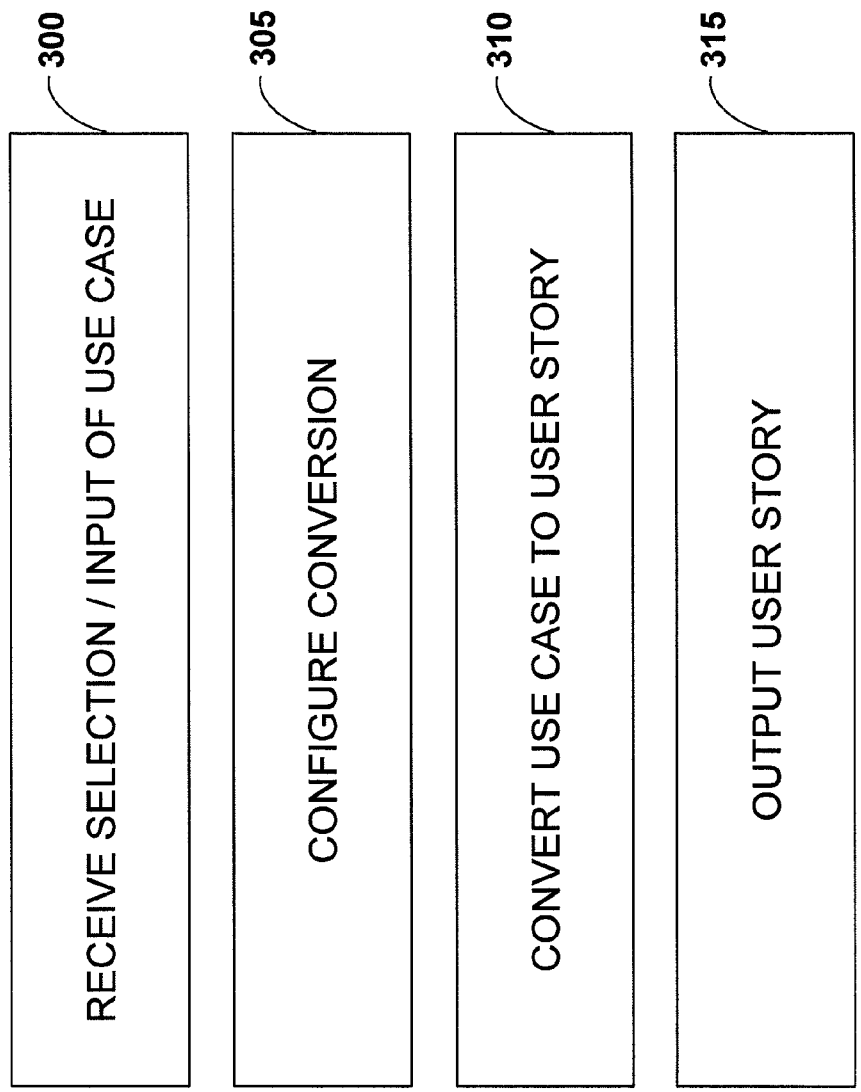
FIG. 3 is flowchart illustrating operations and processes that can be used in accordance with various embodiments of the present invention.
Figure 4:
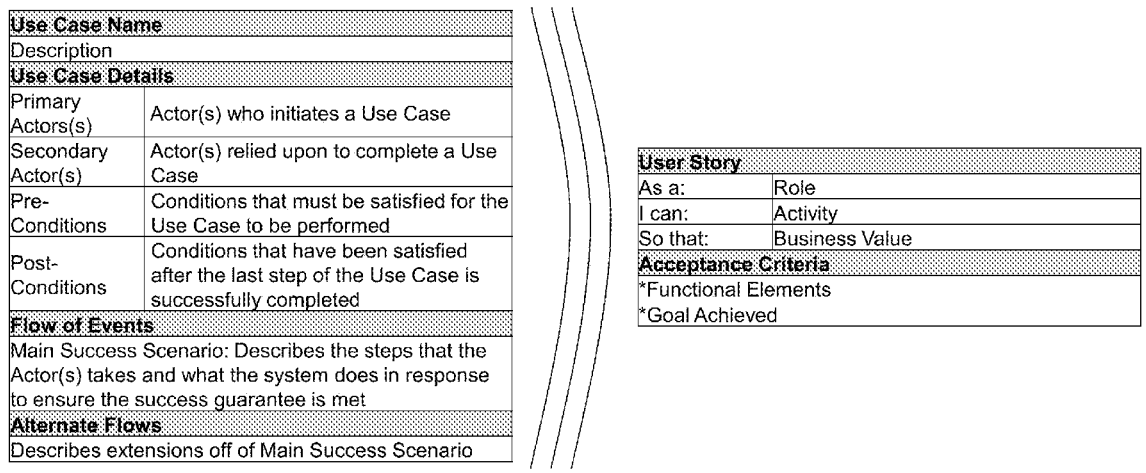

Reference will now be made to FIGS. 3-15. FIG. 3 provides a flowchart illustrating operations and processes that may be performed to convert existing artifacts (e.g., use cases) to new artifacts (e.g., user stories). FIGS. 4-15 show exemplary input and output (including user interactions) that can be produced in accordance with various embodiments of the present invention.

1. Development Methodologies

Software development can follow a number of different methodologies, including the Waterfall methodology and the Agile methodology. Generally, the Waterfall development methodology relies heavily on up-front planning and a set of sequential processes that flow into each other like a waterfall. Such development methodologies may, for instance, employ use cases to define user and/or system interactions to achieve specific goals. The format of a use case is provided in FIG. 4, and an exemplary use case is provided in FIG. 5.

In contrast to the Waterfall development methodology, the Agile development methodology breaks tasks into small increments with minimal planning. Generally, the Agile methodology involves short iterations that allow projects to adapt to changes quickly. For example, such methodologies (e.g., the Agile software development methodology) may begin with the step of coding information. These approaches often deemphasize documentation in favor of collaboration. Moreover, instead of employing use cases, these methodologies often employ user stories as place holders for future conversations while outlining user goals. The format of a user story is provided in FIG. 4, and exemplary user stories are provided in FIGS. 9-13.

2. Artifacts

Given the contrasting approaches in software development methodologies, moving from the Waterfall methodology to the Agile methodology, for example, may require an organization to use a different set of processes and artifacts (e.g., use cases and user stories) for each methodology. The term artifact may refer to many kinds of information produced during the development of software. For example, artifacts may be use cases, user stories, class diagrams, project plans, business cases, risk assessments, Unified Modeling Language (UML) models, requirements, design documents, and/or the like. Such artifacts may help describe the function, architecture, and design of software.

Thus, in various embodiments, when using different development methodologies, it may be advantageous to convert existing artifacts (such as use cases) to new artifacts (such as user stories)—to leverage any existing requirements documentation. Such conversions may save organizations and individuals time that could be lost due to re-work in the methodology transition, reduce the loss of important requirements details, reduce the training time needed to learn to write new artifacts (e.g., user stories), and help users easily understand the relationship between existing artifacts (e.g., use cases) and new artifacts (e.g., user stories).

In the context of converting a use case from a Waterfall methodology to a user story in an Agile methodology, Table 1 provided below shows how use case components can translate to user story components.

TABLE 1

Parent Use Case = Epic User story
Flow of Events = User Stories and Acceptance Criteria
Primary Actor/User Level = As A
Preconditions = Test Cases
Success Guarantee = Acceptance Criteria
Complexity = Story Points In one embodiment, an epic user story may be so large that it can be broken into smaller new artifacts (e.g., user stories). Test cases can be used to validate one or more system requirements and generate a pass or fail. Further, acceptance criteria may define requirements that occur for a new artifact (e.g., a user story) to be accepted as complete.

The following examples are provided in the context of converting a use case (e.g., existing artifact) to one or more user stories (e.g., new artifacts). However, as will be recognized, embodiments of the present invention are not limited to this context. Thus, a variety of other approaches and techniques may be used to adapt to various needs, circumstances, and artifacts.

3. Identification of Existing Artifact(s) for Conversion

Figure 6:
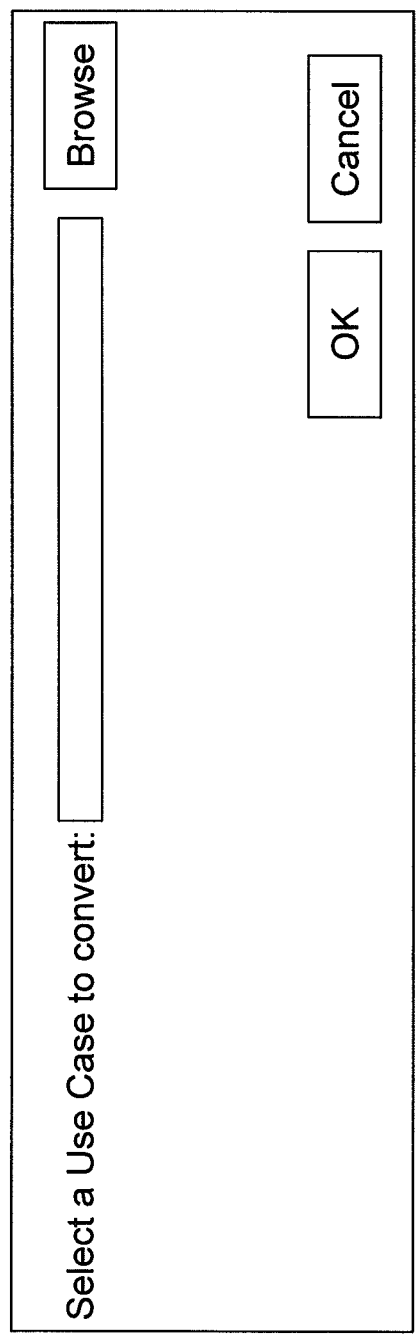

In one embodiment, the process of converting an existing artifact (e.g., use case) to one or more new artifacts (e.g., user stories) may begin when the computing device 100 (e.g., via the input module 270) receives input identifying an existing artifact (e.g., use case) for conversion to one or more new artifacts (e.g., user stories), as indicated in Block 300 of FIG. 3. For example, as shown in FIG. 6, a user (e.g., operating a computing device 100) can navigate to and select an existing artifact (e.g., use case) to convert to one or more new artifacts (e.g., user stories). Existing artifacts (e.g., use cases) may be stored in a variety of forms. For instance, existing artifacts may be stored in files that can be displayed at least in part as human readable text, such as text files, Word files, WordPerfect files, Hypertext Markup Language (HTML) files, OpenOffice files, portable document format (PDF) files, and/or the like. As will be recognized, though, a variety of other formats and file types can be used to adapt to various needs and circumstances.

4. Configuration of Conversion

In one embodiment, after the computing device 100 receives input identifying an existing artifact (e.g., use case) for conversion, the computing device 100 (e.g., via the configuration module 260) can provide a user with the ability to configure the conversion. Configuring the conversion may include configuring a variety of options and parameters.

a. Configuration of Actors

In one embodiment, as shown in FIG. 7, the computing device 100 can allow a user (e.g., operating a computing device 100) to input a description for one or more actors that will be used in the one or more new artifacts (e.g., the user stories). For example, if the term "User" is used in items of an existing artifact (e.g., the use case), it may be desirable to change the term User in the one or more new artifacts to "Customer Administrator." In this example, a user (e.g., operating a computing device 100) can configure the conversion such that the computing device 100 would replace every instance of User with Customer Administrator. In other words, the computing device 100 can replace existing text strings (e.g., User) from the existing artifact with new text strings for any new artifacts (e.g., Customer Administrator). In one embodiment, when the text string(s) representing the actor in the existing artifact (e.g., use case) is the same as the text string(s) to be used as the actor in the one or more new artifacts, the computing device 100 would not need to make any replacements for the actor in the conversion.

b. Configuration of Items

In one embodiment, the computing device 100 can identify items from the existing artifact and display the items. This allows the user to further configure the conversion of each individual item. An item may be any information in the existing artifact. For instance, in one embodiment, each line or sentence in an existing artifact (e.g., use case) may be an item. In another embodiment, each line or sentence under a specific heading in an existing artifact (e.g., use case) may be an item. Thus, the definition of an item may vary to adapt to different types of conversions. Exemplary items are shown in FIG. 8.

In one embodiment, to identify items in an existing artifact (e.g., use case), the computing device 100 can use punctuation, carriage returns, numerals, symbols, spaces, headings, and/or the like. For instance, in one embodiment, each portion of human readable text followed by a carriage return or punctuation symbol in an existing artifact (e.g., use case) can be an item. In another embodiment, each portion of human readable text followed by a carriage return or punctuation symbol under specific headings in an existing artifact (e.g., use case) can be an item.

Continuing with the above example, the computing device 100 may be configured to only identify items under the flow of events heading, the main success scenario heading, and/or the extensions heading in an existing artifact (e.g., use case). Thus, the first item in an existing artifact may include all human readable text (in the flow of events) under the main success scenario to the first carriage return. As shown if FIGS. 5 and 8, the first item in this example is "1. User enters facility, patient identifier information and selects search." Similarly, the second item in an existing artifact may include all human readable text (in the flow of events) from the first carriage return to the second carriage return. As also shown if FIGS. 5 and 8, the second item in this example is "2. System returns results matching search criteria." This process may continue until all items in an existing artifact (e.g., use case) have been identified. For instance, as shown in FIG. 8, all of the items from the existing artifact (e.g., use case) are displayed, with the last item being "3. End" from the extensions heading.

As indicated, FIG. 8 shows the items identified in the existing artifact (e.g., use case) being displayed by the computing device 100. In displaying the items, the computing device 100 may be configured to omit certain human readable text from the items being displayed. For example, the computing device 100 may be configured to omit numerals or other symbols at the beginning of items. For instance, as shown in FIG. 8, the first item from the above example is displayed with the preceding number, period, and space omitted from the display. Thus, the first item ("1. User enters facility, patient identifier information and selects search") is displayed as "User enters facility, patient identifier information and selects search." Other items in the above example can be displayed in a similar manner, such as shown in FIG. 8. As will be recognized, though, various techniques can be used to adapt to a variety of needs and circumstances, such as omitting ending punctuation for items.

In one embodiment, the computing device 100 can also allow for each item identified in an existing artifact (e.g., use case) to be further configured for conversion. Further configuring the conversion of each item may include (1) receiving input identifying items being displayed for conversion and (2) receiving input identifying a type for each item to be converted (Block 305 of FIG. 3). The different types may include a user story type, an acceptance criteria type, a requirement type, a test case type, a story point type, a default type (e.g., blank value), and/or the like. As will be recognized, a variety of other types can be used with embodiments of the present invention.

In one embodiment, this input may be received by the computing device 100 from a user selecting an option from a drop-down menu, entering text, clicking on a radio button, and/or the like. FIG. 8 shows various items with exemplary types associated with each item. Moreover, the user (e.g., operating a computing device 100) only inputs a type for items that are to be converted. In this example, the default for each item is a blank value. In such an embodiment, an item may need to be associated with a type other than the default type to be converted. That is, in one embodiment, in the conversion, the computing device 100 may disregard all items associated with the default type (e.g., blank value).

5. Conversion of Existing Artifact(s) to New Artifact(s)

In one embodiment, after the computing device 100 receives (1) input identifying items being displayed for conversion and (2) input identifying a type for each item to be converted, the computing device 100 (e.g., via the conversion module 250) can convert the specific items (Block 310 of FIG. 3). Converting the items may include a variety of customizable operations and processes.

a. New Artifact(s)

In one embodiment, as part of the conversion, the computing device 100 may create/generate/produce a new artifact (e.g., user story) for every item that is identified as user story—e.g., associated with a user story type. The computing device 100 may also create/generate/produce an acceptance criteria for each item associated with an accept criteria type. This may require including each item associated with an accept criteria type with the user story type identified prior to the accept criteria type. In this example, the items can be grouped by type and then proximity to one another (and the other items). For instance, if an item is associated with a user story type and the three items below are each associated with accept criteria types, the computing device 100 can include all three of the items associated with the accept criteria type in the new artifact (e.g., the user story). FIGS. 9-13 show new artifacts (e.g., user stories) that have been created. In these examples, each new artifact includes an item that was associated with a user story type and an accept criteria type as described above.

Figure 14:
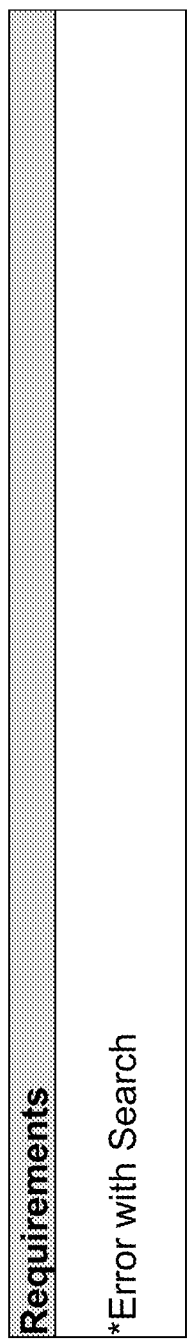

The computing device 100 may also create/generate/produce a new artifact (e.g., requirement) for each item that is associated with a requirement type (e.g., all items with a requirement type can be grouped together), such as shown in FIGS. 14 and 15. In one embodiment, requirements can be distinct from user stories because they may be applicable to more than one user story. Although, in certain embodiments, a requirement may only apply to a single user story.

Additionally, in the conversion, the computing device 100 may disregard each item associated with the default type (e.g., blank value). In other words, items associated with the default type (e.g., blank value) are not converted to new artifacts.

In one embodiment, the computing device 100 can iterate through each item until each identified item has been included in at least one new artifact (e.g., user stories and requirements). This approach allows the computing device 100 to create a new artifact for (a) each user story and corresponding acceptance criteria and (b) the various requirements (individually and/or collectively).

b. Text of New Artifact(s)

In one embodiment, the text of the new artifacts (e.g., user stories) may be the same as or vary from the existing artifact (e.g., use case). For example, as indicated, the computing device 100 may replace the one or more actors from the existing artifact (e.g., use case) with the one or more actors in the new artifacts (e.g., user stories). Thus, continuing with the above example, the computing device 100 can replace existing text strings (e.g., User) from the existing artifact with new text strings (e.g., Customer Administrator) for any new artifacts. That is, in the new artifact (e.g., user story), for example, the computing device 100 can replace every instance of User with Customer Administrator.

Additionally, the computing device 100 may be configured to include additional text in the new artifacts (e.g., user stories). For example, the computing device 100 may insert text in the new artifact, such pre-pending the text "As a" before each instance of the actor in each item associated with a user story type. Further, the computing device 100 may also insert other text in the new artifacts, such as appending the text "I need to" after each instance of the actor in each item associated with a user story type. That is, the computing device 100 can insert the text "As a" <Actor> "I need to" in each item associated with a user story type. The remaining text of the item may be identified as the goal of the new artifact (e.g., user story).

Exemplary user story type and accept criteria type conversions are shown in FIGS. 9-15. For example, the first item displayed in FIG. 8 is "User enters facility, patient identifier information and selects search." Thus, the computing device 100 may modify the text of this item by (a) pre-pending "As a" to the actor, (2) replacing the User with Customer Administrator, and (3) appending "I need to" the new actor. Thus, the modified text would be "As a Customer Administrator I need to enters facility, patient identifier information and selects search." Additionally, the second item shown in FIG. 8, which is associated with accept criteria type, will be included with this new artifact (as shown in FIG. 9A). The text of the second item is not modified in this example. Additional exemplary conversions following a similar format are shown in FIGS. 10A, 11A, 12A, and 13A.

In various embodiments, the computing device 100 can include appropriate headings (e.g., labels) for items in the new artifacts. In one embodiment, the headings may correspond to the specific types for the various items. For example, as shown in FIG. 9A, the first item is labeled as a user story and the second item is labeled as acceptance criteria.

In one embodiment, the computing device 100 may also create/generate/produce a new artifact (e.g., requirement) for each item associated with a requirement type (see FIGS. 14 and 15). Items associated with requirement types can be created/generated/produced as a collective new artifact or as individual new artifacts because they may be applicable to more than one user story. Although, in certain embodiments, a requirement may only apply to a single user story. In these particular examples, the text of the requirements has not been modified.

Furthermore, the computing device 100 can apply grammar (e.g., verb, tense), punctuation, and/or spelling correction to the text of the new artifacts. In one embodiment, the grammar (e.g., verb, tense), punctuation, and/or spelling correction may be automatic. In another embodiment, such correction may be received by the computing device 100 as input from a user (e.g. operating a computing device 100). Exemplary new artifacts (e.g., user stories) after having grammar (e.g., verb, tense), punctuation, and/or spelling correction performed are shown in FIGS. 9B, 10B, 11B, 12B, and 13B. The versions of these artifacts without having the grammar, punctuation, and spelling corrected are respectively shown in FIGS. 9A, 10A, 11A, 12A, and 13A.

6. Output of New Artifact(s)

In one embodiment, as indicated in Block 315 of FIG. 3, the process may end with the computing device 100 (e.g., via the output module 240) outputting the one or more new artifacts (e.g., user stories and/or requirements). New artifacts (e.g., user stories and/or requirements) may be output in a variety of forms. For example, new artifacts (e.g., user stories and/or requirements) may be output as one or more files that can be displayed at least in part as human readable text, such as text files, Word files, WordPerfect files, Hypertext Markup Language (HTML) files, OpenOffice files, PDF files, and/or the like. As will be recognized, though, a variety of other formats and file types can be used to adapt to various needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for converting a use case to one or more user stories, the method comprising:
   electronically receiving input identifying a use case for conversion to one or more user stories;
   electronically identifying a plurality of items from the use case and causing display of the plurality of items;
   electronically receiving input from a user selecting (a) one or more of the plurality of items from the use case for conversion to the one or more user stories and (b) a type for each of the one or more of the plurality of items,
   wherein the type for each of the one or more of the plurality of items is selected from the group consisting of (a) a user story, (b) a requirement, and (c) an acceptance criterion;
   electronically receiving input identifying one or more actors for the one or more user stories, wherein the one or more actors for the one or more user stories are to replace one or more actors from the use case; and
   electronically converting the one or more of the plurality of items from the use case to the one or more user stories, wherein converting comprises replacing the one or more actors from the use case with the one or more actors for the user stories.

2. The method of claim 1, wherein the plurality of items from the use case are identified by at least one of punctuation, carriage returns, numerals, symbols, or spaces.

3. The method of claim 1, wherein converting the one or more of the plurality of items from the use case to the one or more user stories comprises (a) grouping items by type and proximity and (b) inserting text strings into the user stories.

4. The method of claim 1, wherein the replaced actors for the user stories define one or more new text string functions for software development that replace one or more previously defined text string functions for the development of the software.

5. The method of claim 1, further comprising:
   automatically electronically including additional text that is pre-pended or appended to the new text string functions in response to receipt of input identifying the additional text as being designated as pre-pended or appended data.

6. A computer program product for converting a use case to one or more user stories, the computer program product comprising at least one non-transitory computer-readable storage medium having computer-readable program code portions stored therein, the computer-readable program code portions comprising:
   an executable portion configured to receive input identifying a use case for conversion to one or more user stories;

an executable portion configured to identify a plurality of items from the use case and cause display of the plurality of items;

an executable portion configured to receive input from a user selecting (a) one or more of the plurality of items from the use case for conversion to the one or more user stories and (b) a type for each of the one or more of the plurality of items, wherein the type for each of the one or more of the plurality of items is selected from the group consisting of (a) a user story, (b) a requirement, and (c) an acceptance criterion;

an executable portion configured to receive input identifying one or more actors for the one or more user stories, wherein the one or more actors for the one or more user stories are to replace one or more actors from the use case; and an executable portion configured to convert the one or more of the plurality of items from the use case to the one or more user stories, wherein converting comprises replacing the one or more actors from the use case with the one or more actors for the user stories.

7. The computer program product of claim 6, wherein the plurality of items from the use case are identified by at least one of punctuation, carriage returns, numerals, symbols, or spaces.

8. The computer program product of claim 6, wherein converting the one or more of the plurality of items from the use case to the one or more user stories comprises (a) grouping items by type and proximity and (b) inserting text strings into the user stories.

9. The computer program product of claim 6, wherein the replaced actors for the user stories define one or more new text string functions for software development that replace one or more previously defined text string functions for the development of the software.

10. The computer program product of claim 6, further comprising:

an executable portion configured to automatically include additional text that is pre-pended or appended to the new text string functions in response to receipt of input identifying the additional text as being designated as pre-pended or appended data.

11. An apparatus comprising at least one processor and at least one memory including computer program code, the at least one memory and the computer program code configured to, with the processor, cause the apparatus to at least:

receive input identifying a use case for conversion to one or more user stories;

identify a plurality of items from the use case and cause display of the plurality of items;

receive input from a user selecting (a) one or more of the plurality of items from the use case for conversion to the one or more user stories and (b) a type for each of the one or more of the plurality of items, wherein the type for each of the one or more of the plurality of items is selected from the group consisting of (a) a user story, (b) a requirement, and (c) an acceptance criterion;

receive input identifying one or more actors for the one or more user stories, wherein the one or more actors for the one or more user stories are to replace one or more actors from the use case; and convert the one or more of the plurality of items from the use case to the one or more user stories, wherein converting comprises replacing the one or more actors from the use case with the one or more actors for the user stories.

12. The apparatus of claim 11, wherein the plurality of items from the use case are identified by at least one of punctuation, carriage returns, numerals, symbols, or spaces.

13. The apparatus of claim 11, wherein converting the one or more of the plurality of items from the use case to the one or more user stories comprises (a) grouping items by type and proximity and (b) inserting text strings into the user stories.

14. The apparatus of claim 11, wherein the replaced actors for the user stories define one or more new text string functions for software development that replace one or more previously defined text string functions for the development of the software.

15. The apparatus of claim 11, wherein the memory and the computer program code are further configured to, with the processor, cause the apparatus to:

automatically include additional text that is pre-pended or appended to the new text string functions in response to receipt of input identifying the additional text as being designated as pre-pended or appended data.

\* \* \* \* \*